(12) United States Patent
Cameron et al.

(10) Patent No.: US 8,104,074 B2
(45) Date of Patent: Jan. 24, 2012

(54) IDENTITY PROVIDERS IN DIGITAL IDENTITY SYSTEM

(75) Inventors: Kim Cameron, Bellevue, WA (US); Arun K. Nanda, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 987 days.

(21) Appl. No.: 11/361,281

(22) Filed: Feb. 24, 2006

(65) Prior Publication Data

US 2007/0204168 A1    Aug. 30, 2007

(51) Int. Cl.
H04L 29/00    (2006.01)
(52) U.S. Cl. .............................. 726/5; 713/170; 709/229
(58) Field of Classification Search ................... 713/170; 709/229
See application file for complete search history.

(56) References Cited

U.S. PATENT DOCUMENTS

| | | |
|---|---|---|
| 5,442,704 A | 8/1995 | Holtey |
| 5,657,388 A | 8/1997 | Weiss |
| 5,659,616 A | 8/1997 | Sudia |
| 5,678,015 A | 10/1997 | Goh |
| 5,887,131 A | 3/1999 | Angelo |
| 5,907,838 A | 5/1999 | Miyasaka et al. |
| 5,995,625 A | 11/1999 | Sudia |
| 6,005,939 A | 12/1999 | Fortenberry et al. |
| 6,016,476 A | 1/2000 | Maes |
| 6,161,125 A | 12/2000 | Traversat et al. |
| 6,442,532 B1 | 8/2002 | Kawan |
| 6,526,434 B1 | 2/2003 | Carlson |
| 6,553,494 B1 | 4/2003 | Glass |
| 6,754,829 B1 | 6/2004 | Butt |
| 6,785,810 B1 | 8/2004 | Lirov et al. |
| 6,791,583 B2 | 9/2004 | Tang |
| 6,802,002 B1 | 10/2004 | Corella |
| 6,810,480 B1 | 10/2004 | Parker et al. |
| 6,817,521 B1 | 11/2004 | Matada |
| 6,836,765 B1 | 12/2004 | Sussman |
| 6,839,690 B1 | 1/2005 | Foth |
| 6,856,963 B1 | 2/2005 | Hurwitz |
| 6,879,769 B1 | 4/2005 | Kawai et al. |
| 6,934,841 B2 | 8/2005 | Boyles et al. |
| 6,934,913 B2 | 8/2005 | Le et al. |
| 6,955,295 B2 | 10/2005 | Hosogoe |
| 6,957,338 B1 | 10/2005 | Sumino |

(Continued)

FOREIGN PATENT DOCUMENTS

CN    1456983 A    11/2003

(Continued)

OTHER PUBLICATIONS

About Authentication, http://www.Microsoft.com/windows2000/en/server/iis/default.asp?url=/windows2000/en/server/iis/htm/core/iiabasc.htm, pp. 1-5, last updated Feb. 28, 2000.

(Continued)

*Primary Examiner* — Vivek Srivastava
*Assistant Examiner* — Thong Truong
(74) *Attorney, Agent, or Firm* — Merchant & Gould PC

(57) ABSTRACT

A digital identity system includes a principal including an identity selector programmed to receive a security policy from a relying party, review a plurality of digital identities associated with the principal, and request one or more claims related to an identity of the principal from an identity provider. The principal is further programmed to receive one or more security tokens including the claims from the identity provider, and to forward the security tokens to the relying party.

16 Claims, 9 Drawing Sheets

U.S. PATENT DOCUMENTS

| | | | |
|---|---|---|---|
| 6,981,043 | B2 | 12/2005 | Botz |
| 6,993,659 | B2 | 1/2006 | Milgramm et al. |
| 7,000,108 | B1 | 2/2006 | Yarsa |
| 7,007,298 | B1 | 2/2006 | Shinzaki et al. |
| 7,020,474 | B2 | 3/2006 | Scott |
| 7,020,778 | B1 | 3/2006 | Miettinen |
| 7,047,418 | B1 | 5/2006 | Ferren et al. |
| 7,069,447 | B1 | 6/2006 | Corder |
| 7,083,095 | B2 | 8/2006 | Hendrick |
| 7,103,773 | B2* | 9/2006 | Erickson et al. ............ 713/170 |
| 7,131,583 | B2 | 11/2006 | Jaros |
| 7,146,159 | B1 | 12/2006 | Zhu |
| 7,162,475 | B2 | 1/2007 | Ackerman |
| 7,162,581 | B2 | 1/2007 | Newman |
| 7,206,432 | B2 | 4/2007 | Iwamura |
| 7,231,371 | B1 | 6/2007 | Cantini |
| 7,266,705 | B2 | 9/2007 | Peck et al. |
| 7,356,837 | B2 | 4/2008 | Asghari-Kamrani |
| 7,409,543 | B1 | 8/2008 | Bjorn |
| 7,424,457 | B2 | 9/2008 | Khaishgi |
| 7,451,921 | B2 | 11/2008 | Dowling |
| 7,475,429 | B2 | 1/2009 | Carro |
| 7,680,819 | B1 | 3/2010 | Mellmer |
| 7,788,499 | B2 | 8/2010 | Cameron |
| 2001/0034746 | A1 | 10/2001 | Tsakiris |
| 2001/0054148 | A1 | 12/2001 | Hoornaert et al. |
| 2002/0010862 | A1 | 1/2002 | Ebara |
| 2002/0026397 | A1 | 2/2002 | Ieta |
| 2002/0046041 | A1 | 4/2002 | Lang |
| 2002/0103801 | A1 | 8/2002 | Lyons |
| 2002/0124115 | A1 | 9/2002 | McLean et al. |
| 2002/0133535 | A1 | 9/2002 | Lucovsky et al. |
| 2002/0175916 | A1 | 11/2002 | Nichols et al. |
| 2002/0184508 | A1 | 12/2002 | Bialick |
| 2002/0194139 | A1 | 12/2002 | Kianian |
| 2003/0005305 | A1 | 1/2003 | Brickell |
| 2003/0018585 | A1 | 1/2003 | Butler |
| 2003/0046575 | A1 | 3/2003 | Bhogal |
| 2003/0046591 | A1 | 3/2003 | Asghari-Kamrani |
| 2003/0048904 | A1 | 3/2003 | Wang |
| 2003/0074660 | A1 | 4/2003 | McCormack |
| 2003/0135500 | A1 | 7/2003 | Chevrel et al. |
| 2003/0149781 | A1* | 8/2003 | Yared et al. ................ 709/229 |
| 2003/0172090 | A1 | 9/2003 | Asunmaa et al. |
| 2003/0177356 | A1 | 9/2003 | Abela |
| 2003/0182421 | A1 | 9/2003 | Faybishenko |
| 2003/0188019 | A1 | 10/2003 | Wesley |
| 2003/0200175 | A1 | 10/2003 | Wang et al. |
| 2003/0200217 | A1 | 10/2003 | Ackerman |
| 2003/0216136 | A1 | 11/2003 | McBrearty |
| 2003/0229783 | A1 | 12/2003 | Hardt |
| 2003/0233580 | A1 | 12/2003 | Keeler |
| 2004/0010720 | A1 | 1/2004 | Singh et al. |
| 2004/0054913 | A1 | 3/2004 | West |
| 2004/0064708 | A1 | 4/2004 | Angelo et al. |
| 2004/0103040 | A1 | 5/2004 | Ronaghi |
| 2004/0103324 | A1 | 5/2004 | Band |
| 2004/0111520 | A1 | 6/2004 | Krantz et al. |
| 2004/0114571 | A1 | 6/2004 | Timmins |
| 2004/0122926 | A1 | 6/2004 | Moore |
| 2004/0162786 | A1 | 8/2004 | Cross |
| 2004/0205243 | A1 | 10/2004 | Hurvig |
| 2004/0230831 | A1 | 11/2004 | Spelman et al. |
| 2004/0250084 | A1 | 12/2004 | Hamid |
| 2005/0044423 | A1 | 2/2005 | Mellmer |
| 2005/0050363 | A1 | 3/2005 | Naka |
| 2005/0059494 | A1 | 3/2005 | Kammler |
| 2005/0065810 | A1 | 3/2005 | Bouron |
| 2005/0074028 | A1 | 4/2005 | Wugofski |
| 2005/0091264 | A1 | 4/2005 | Cameron |
| 2005/0091290 | A1 | 4/2005 | Cameron |
| 2005/0091492 | A1 | 4/2005 | Benson et al. |
| 2005/0091495 | A1 | 4/2005 | Cameron |
| 2005/0108575 | A1* | 5/2005 | Yung ............................ 713/201 |
| 2005/0114447 | A1 | 5/2005 | Cameron |
| 2005/0122926 | A1 | 6/2005 | Cromer |
| 2005/0124320 | A1* | 6/2005 | Ernst et al. .................. 455/411 |
| 2005/0125677 | A1 | 6/2005 | Michaelides |
| 2005/0125678 | A1 | 6/2005 | Shaw et al. |
| 2005/0149383 | A1 | 7/2005 | Zacharia |
| 2005/0152544 | A1 | 7/2005 | Kizawa |
| 2005/0172229 | A1 | 8/2005 | Remo |
| 2005/0182741 | A1 | 8/2005 | Grossman et al. |
| 2005/0183566 | A1 | 8/2005 | Nash |
| 2005/0216405 | A1 | 9/2005 | So |
| 2005/0283443 | A1 | 12/2005 | Hardt |
| 2006/0005020 | A1 | 1/2006 | Hardt |
| 2006/0005263 | A1 | 1/2006 | Hardt |
| 2006/0010007 | A1 | 1/2006 | Denman et al. |
| 2006/0043164 | A1 | 3/2006 | Dowling |
| 2006/0080702 | A1 | 4/2006 | Diez |
| 2006/0104486 | A1 | 5/2006 | Le Saint et al. |
| 2006/0129509 | A1 | 6/2006 | Gaines et al. |
| 2006/0165060 | A1 | 7/2006 | Dua |
| 2006/0174323 | A1 | 8/2006 | Brown |
| 2006/0174350 | A1 | 8/2006 | Roever |
| 2006/0200866 | A1 | 9/2006 | Cameron |
| 2006/0206723 | A1 | 9/2006 | Gil et al. |
| 2006/0206724 | A1 | 9/2006 | Schaufele et al. |
| 2006/0224611 | A1 | 10/2006 | Dunn |
| 2006/0253582 | A1 | 11/2006 | Dixon |
| 2006/0282670 | A1 | 12/2006 | Karchov |
| 2007/0011100 | A1 | 1/2007 | Libin |
| 2007/0124269 | A1 | 5/2007 | Rutter et al. |
| 2007/0124596 | A1 | 5/2007 | Chevrel |
| 2007/0143835 | A1 | 6/2007 | Cameron et al. |
| 2007/0194884 | A1 | 8/2007 | Didier et al. |
| 2007/0203852 | A1 | 8/2007 | Cameron |
| 2007/0204325 | A1 | 8/2007 | Cameron et al. |
| 2007/0300183 | A1 | 12/2007 | Anttila |
| 2008/0028215 | A1 | 1/2008 | Nanda |
| 2008/0034412 | A1 | 2/2008 | Wahl |
| 2008/0103972 | A1 | 5/2008 | Lanc |
| 2008/0178271 | A1 | 7/2008 | Gajjala |
| 2008/0178272 | A1 | 7/2008 | Gajjala |
| 2008/0184339 | A1 | 7/2008 | Shewchuk |
| 2008/0289020 | A1 | 11/2008 | Cameron et al. |
| 2010/0227680 | A1 | 9/2010 | Leopold et al. |
| 2010/0287369 | A1 | 11/2010 | Monden |

FOREIGN PATENT DOCUMENTS

| | | |
|---|---|---|
| CN | 1589446 A | 3/2005 |
| CN | 1794284 A | 6/2006 |
| EP | 0 767 418 A1 | 4/1997 |
| EP | 0 944 218 A1 | 9/1999 |
| EP | 1 471 682 A1 | 10/2004 |
| EP | 1 729 480 A1 | 12/2006 |
| JP | 63-242751 A | 10/1988 |
| JP | 2001-344205 | 12/2001 |
| JP | 2005-38095 | 2/2005 |
| JP | 2005-518039 | 6/2005 |
| JP | 2006-524847 | 11/2006 |
| JP | 2010-517140 A | 5/2010 |
| JP | 2010-517176 A | 5/2010 |
| KR | 1020010110084 | 12/2001 |
| KR | 1020020096442 | 12/2002 |
| KR | 1020040048115 | 7/2004 |
| WO | WO 99/49614 | 9/1999 |
| WO | WO0129641 A2 | 4/2001 |
| WO | WO 03-053123 A2 | 7/2003 |
| WO | WO 2004/036348 A2 | 4/2004 |
| WO | WO 2004/044705 A2 | 5/2004 |
| WO | WO 2004/057796 A1 | 7/2004 |
| WO | WO 2007/097844 A1 | 8/2007 |
| WO | WO 2008/088944 A1 | 7/2008 |
| WO | WO 2008/088945 A1 | 7/2008 |
| WO | WO 2008/144204 A1 | 11/2008 |

OTHER PUBLICATIONS

Benjamin, Henry, CCIE Self-Study: Security Protocols, Extensible Authentication Protocol, Protected EAP, and Temporal Key Integrity Protocol, http://www.ciscopress.com/articles/article.asp?p=422947&seqNum=7&rl=1, pp. 1-4, Oct. 28, 2005.

U.S. Appl. No. 11/312,920, filed Dec. 19, 2005.

A Guide to Integrating with InfoCard v1.0, *Microsoft Corporation*, pp. 1-62 (Aug. 2005).

A Technical Reference for InfoCard v1.0 in Windows, *Microsoft Corporation*, pp. 1-36 (Aug. 2005).

Access Control Smart Card: Two-Factor Authentication for the Enterprise Logical Access Control for the Enterprise, pp. 1-2, printed on Jul. 12, 2006 from http://www.cardwerk.com/smart-card-solutions/logical-access-control/.

Andy Harjanto's InfoCard WebLog, *MSDN Blogs*, http://blogs.msdn.com/andyhar/archive/2005/11/22/495649.aspx, 3 pages (Nov. 22, 2005).

Cameron, K., "The Laws of Identity," *Architect of Identity, Microsoft Corporation*, pp. 1-12 (May 12, 2005).

Chappell, Introducing InfoCard, Apr. 2006, pp. 1-16,http://msdn.microsoft.com/winfx/reference/infocard/default.aspx?pull=/library/en-us/dnlong/html/introinfocard.asp.

European Search Report cited in Application No. 06838382.7 mailed Sep. 18, 2009.

Evans, D. et al., "Private key infrastructure: balancing computer transmission privacy with changing technology and security demans," *Computer Standards & Interfaces*, vol. 27, pp. 423-437 (2005).

Hunt, R., "Technological infrastructure for PKI and digital certification," *Computer Communications*, vol. 24, pp. 1460-1471 (2001).

International Search Report and Written Opinion cited in PCT/US2006/045386 mailed Apr. 20, 2007.

Jøsang, A. et al., "What You See is Not Always What You Sign," *Proceedings of AUUG2002*, Melbourne, Australia, pp. 1-13 (Sep. 4-6, 2002).

Lancaster, S. et al., "Public key infrastructure: a micro and macro analysis," *Computer Standards & Interfaces*, vol. 25, pp. 437-446 (2003).

Q&A: Microsoft's Kim Cameron Wins 'Balancing Innovation and Reality' Award for Contributions to Digital Identity, *Microsoft PressPass*, 3 pages (May 12, 2005).

U.S. Non-Final Office Action cited in U.S. Appl. No. 11/312,920 mailed Apr. 15, 2009.

U.S. Final Office Action cited in U.S. Appl. No. 11/312,920 mailed Sep. 8, 2009.

U.S. Non-Final Office Action cited in U.S. Appl. No. 11/495,830 mailed Jul. 16, 2009.

What is Microsoft InfoCard?, *Johannes Ernst's Blog*, pp. 1-4 (May 18, 2005).

U.S. Non-Final Office Action cited in U.S. Appl. No. 11/312,920 mailed Dec. 31, 2009.

European Examination Report cited in EP 06838382.7 dated Nov. 19, 2009.

International Search Report cited in PCT/EP/00/10284 dated Aug. 20, 2001.

U.S. Final Office Action cited in U.S. Appl. No. 11/495,830 mailed Mar. 3, 2010.

U.S. Non-Final Office Action cited in U.S. Appl. No. 11/495,830 mailed Aug. 30, 2010.

Ernst, Johannes, "What is Microsoft InfoCard?" Johannes Ernst's Blog, May 18, 2005, 4 pages.

International Search Report cited in PCT/US2008/050205 mailed May 14, 2008, 12 pages.

Liberty Alliance Project Whitepaper: Personal Identity, Mar. 23, 2006, 13 pages.

U.S. Office Action cited in U.S. Appl. No. 11/856,617 mailed Sep. 13, 2010 24 pages.

U.S. Office Action cited in U.S. Appl. No. 11/856,636 mailed Oct. 7, 2010 19 pages.

Audio-Visual Multimodal Fusion for Biometric Person Authentication and Live ness Verification http://delivery.acm.org/10.1145/1160000/1151808/p17-chetty.pdf?key1=1151808&key2=9045972611&coll=GUIDE&dl=GUIDE&CFID=75919783&CFTOKEN=92791909, Copyright 2006.

The fusion framework in a person identity verification system based on face and speech data http://ieeexplore.ieee.org/search/srchabstract.jsp?arnumber=1557132&isnumber=33117&punumber=10384&k2dockey=1557132@ieeecnfs&query=%28++identity+verification%3Cin%3Ede%29&pos=14, Saskatoon, May 2005.

U.S. Appl. No. 11/749,020, Ackerman et al., filed May 15, 2007, not yet published.

Chappell; "Introducing Windows CardSpace" [online], MSDN, [retrieved on Nov. 27, 2007], Apr. 2006, pp. 1-18, http://msdn2.microsoft.com/en-us/library/aa480189.aspx#introinfocard_topic2.

Chappell; "Introducing Windows CardSpace" Apr. 2006, 2010 Microsoft Corporation, http://msdn.microsoft.com/en-us/library/aa480189(printer).aspx); 13 pgs.

Computations. (2001), in Chambers 21st Century Dictionary, London: Chambers Harrap., Retrieved May 26, 2009 from <http://www.credoreference.com/entry/chambdict/computational> (cited in 0325us01 10.14.20090A).

Costa et al. "E-Services in Mission-Critical Organizations: Identification Enforcement," ICEIS 2004— Software Agents and Internet Computing, http://www-lih.univ-lehavre.fr/Intranet/proceedings/ICEIS2004/ICEIS %202004/Area%204%20-%20Software%20Agents%20and%20Internet%20Computing/Oral%20Presentations/Short%20Papers/C4_727_Costa.pdf. [8 pages].

Daemen et al., "The Identity Metasystem: Towards a Privacy-Compliant Solution to the Challenges of Digital Identity"; Oct. 2006; Microsoft Corporation White Paper; 21 pgs.

Display. (2000), In Collins English Dictionary, London: Collins, Retrieved May 26, 2009 from <http://www.credoreference.com/entry/hcengdict/display> (cited in 0325us01 10.14.2009 OA).

Fahrenholtz et al., "Transactional Security for a Distributed Reputation Manaement System", Lecture Notes in Computer Science, vol. 2455, 2002.

Force, G., Sr., Portable data encryption approaches, http://ieeexplore.ieee.org/xpl/freeabs_all.jsp?arnumber=485417, Nat. Semicond. Corp., (1995) 1-page.

Jones, "The Identity Metasystem: A User-Centric, Inclusive Web Authentication Solution", [online], Microsoft, 2005, pp. 1-27, http://www.w3.org/2005/Security/usability-ws/presentations/28-jones-id-metasystem.

Lee et al., A Flexible Remote User Authentication Scheme Using Smart Cards, Chaoyang University of Technology, pp. 46-52 http://delivery.acm.org/10.1145/570000/567335/p46-lee.pdf?key1=567335&key2=8102952511&coll=Guide&d1=Guide&Cfid=912131&Cftoken=21372357; Jul. 2002.

Lin et al., A flexible biometrics remote user authentication scheme, Tunghai University, (2004), 5 pages, http://islab.cis.thu.edu.tw/files/teacher/115.pdf.

Maximilien et al., "Conceptual Model of Web Service Reputation", ©2002, pp. 1-6.

Maximilien et al., "Reputation and Endorsement for Web Services", ACM Inc. printed Dec. 9, 2005.

Menezes et al., "Handbook of Applied Cryptography", CRC Press, 1996, Chapter 11 included; available at <http://www.cacr.math.uwaterloo.ca/hac> (cited in 0325us01 Oct. 14, 2009 OA).

Nakamura et al. "Model-Driven Security Based on a Web Services Security Architecture," Proceedings of the 2005 IEEE International Conference on Services Computing (Scc'05), Jul. 15, 2005. [9 pages].

Party. (2004), In Roget's II The New Thesaurus, Boston, MA: Houghton Mifflin, <http://www.credoreference.com/entry/hmrogets/party>. (cited in 0325us01 Aug. 11, 2009 AA).

Resnick et al., "ACM Portal, the ACM Digital Library", Reputation Systems, vol. 43, No. 12, http://delivery.acm.org/10.1145/360000/355122/p45-resnick.html?key1+355122&key2=18 . . . (2000).

"Strong Authentication on Mobile Devices Leveraging the OATH Open Framework" [online], Diversinet, May 10, 2005, pp. 1-17, http://conference.digitalidworld.com/2005/attendees/slides/Sea_C_0510_1330a.pdf.

Techtree News Staff, "Infocard Spells End of Passwords." Techtree.com India, Feb. 16, 2006, 2 pgs.

Token. (2000), In Collins English Dictonary, London: Collins, <http://www.credoreference.com/entry/hcengdict/token>. (cited in 0325us01 Aug. 11, 2009 Aa).

"Valimo Mobile Identity Platform for Financial Services", [online], HP, Dec. 2006, pp. 1-4, http://h71028.www7.hp.com/ERC /downloads/4AA0-9344ENW.pdf.

Von Welch et al. "Security for Grid Services," Proceedings of the 12th IEEE International Symposium on High Performance Distributed Computing (HPDC'03), Jun. 24, 2003. [10 pages].

Wireless Application Forum, Ltd. "WAP Provisioning Smart Card," Jul. 10, 2001, http://simon.dehartog.nl/datasheets/protocols/WAP/WAP-186-PROVSC-20010710-a.pdf. [37 pages].

You, Mobile Card Architecture for User Mobility and VHE in Heterogeneous Network Environments, http://www.cnsr.info/Download/Pdf/posterl.pdf., University of New Brunswick (2003) 2 pages.

International Search Report and Written Opinion cited in PCT/US2007/001362 mailed Jun. 27, 2007.

Written Opinion of the International Searching Authority cited in PCT/US2007/013310 mailed Dec. 4, 2007.

International Search Report cited in PCT/US2008/050204 mailed Jun. 12, 2008.

International Search Report cited in PCT/US2008/051814 mailed Apr. 30, 2009.

Supplementary European Search Report and Opinion cited in Application No. PCT/US2007001362 mailed Oct. 7, 2009.

Chinese Office Action cited in Application No. 200880003205.8 mailed Jun. 12, 2010.

Chinese Office Action cited in Application No. 200780006584.1 mailed Aug. 4, 2010.

Chinese Office Action cited in Application No. 200880002607.6 mailed Sep. 14, 2010.

Chinese Office Action cited in Application No. 200680047525.4 mailed Nov. 10, 2010

U.S. Office Action cited in U.S. Appl. No. 11/361,857 mailed Nov. 10, 2008.

U.S. Office Action cited in U.S. Appl. No. 11/361,857 mailed May 29, 2009.

U.S. Office Action cited in U.S. Appl. No. 11/495,826 mailed Jul. 15, 2009.

U.S. Office Action cited in U.S. Appl. No. 11/361,857 mailed Oct. 14, 2009.

U.S. Office Action cited in U.S. Appl. No. 11/495,826 mailed Mar. 30, 2010.

U.S. Office Action cited in U.S. Appl. No. 11/361,857 mailed Mar. 31, 2010.

U.S. Office Action cited in U.S. Appl. No. 11/952,890 mailed Oct. 7, 2010.

U.S. Office Action cited in U.S. Appl. No. 11/749,020 mailed Dec. 27, 2010.

Chinese 2nd Office Action cited in Application No. 200880002607.6 dated Mar. 22, 2011, 26 pages.

European Communication cited in Application No. 08 713 521.6 mailed Apr. 15, 2011, 4 pages.

European Communication cited in Application No. 08 713 522.4 mailed Apr. 15, 2011, 4 pages.

U.S. Office Action cited in U.S. Appl. No. 11/952,890 mailed Apr. 8, 2011, 22 pages.

U.S. Office Action cited in U.S. Appl. No. 11/856,636 mailed May 4, 2011, 25 pages.

Chinese 2nd Office Action mailed in Application No. 200680047525.4 mailed Apr. 20, 2011, 11 pgs.

Chinese Office Action cited in Application No. 200880002693.0 dated Jan. 12, 2011, 22 pgs.

European Communication re EP Application No. 07748971.4, mailed Jan. 20, 2010, 5 pp.

International Search Report cited in PCT/US2008/062521 mailed Sep. 22, 2008, 10 pgs.

Notice of Allowance cited in U.S. Appl. No. 11/312,920 mailed Jun. 22, 2010, 9 pgs.

Notice of Allowance cited in U.S. Appl. No. 11/495,826 mailed Mar. 17, 2011, 17 pgs.

Notice of Allowance cited in U.S. Appl. No. 11/495,826 mailed Oct. 15, 2010, 6 pgs.

Notice of Allowance cited in U.S. Appl. No. 11/495,830 mailed Apr. 19, 2011, 17 pgs.

Notice of Allowance cited in U.S. Appl. No. 11/495,830 mailed May 26, 2011, 9 pgs.

Notice of Allowance cited in U.S. Appl. No. 11/856,617 mailed Mar. 29, 2011, 17 pgs.

Notice of Allowance/Decision to Grant in Russian Application No. 2008124907 mailed Jan. 24, 2011, 5 pages, English translation.

Response to Communication from Chinese Intellectual Property Office re Application No. 200880003205.8, filed Dec. 12, 2010, 28 pp.

Response to Communication from Chinese Intellectual Property Office re Application No. 200880002607.6, filed Jan. 13, 2011, 21 pp.

Response to Communication from Chinese Intellectual Property Office re Application No. 200680047525.4, filed Mar. 7, 2011, 14 pp.

Response to Communication from Chinese Intellectual Property Office re Application No. 200880002693.0, filed May 12, 2011, 14 pp.

Response to European Communication re EP Application No. 06838382.7, filed Mar. 29, 2010, 14 pp.

Response to European Communication re EP Application No. 07748971.4, filed May 25, 2010, 13 pp.

U.S. Office Action cited in U.S. Appl. No. 11/749,020 mailed Jun. 10, 2011, 30 pgs.

U.S. Office Action Response cited in U.S. Appl. No. 11/312,920 mailed Jul. 15, 2009, 13 pgs.

U.S. Office Action Response cited in U.S. Appl. No. 11/312,920 mailed Nov. 6, 2009, 11 pgs.

U.S. Office Action Response cited in U.S. Appl. No. 11/312,920 mailed Mar. 31, 2010, 12 pgs.

U.S. Office Action Response cited in U.S. Appl. No. 11/361,857 mailed Feb. 10, 2009, 15 pgs.

U.S. Office Action Response cited in U.S. Appl. No. 11/361,857 mailed Jul. 29, 2009, 6 pgs.

U.S. Office Action Response cited in U.S. Appl. No. 11/361,857 mailed Sep. 29, 2009, 10 pgs.

U.S. Office Action Response cited in U.S. Appl. No. 11/361,857 mailed Dec. 30, 2009, 9 pgs.

U.S. Office Action Response cited in U.S. Appl. No. 11/361,857 mailed Jun. 30, 2010, 6 pgs.

U.S. Office Action Response cited in U.S. Appl. No. 11/495,826 mailed Dec. 15, 2009, 12 pgs.

U.S. Office Action Response cited in U.S. Appl. No. 11/495,826 mailed Aug. 30, 2010, 13 pgs.

U.S. Office Action Response cited in U.S. Appl. No. 11/495,830 mailed Nov. 16, 2009, 15 pgs.

U.S. Office Action Response cited in U.S. Appl. No. 11/495,830 mailed May 3, 2010, 13 pgs.

U.S. Office Action Response cited in U.S. Appl. No. 11/495,830 mailed Nov. 30, 2010, 14 pgs.

U.S. Office Action Response cited in U.S. Appl. No. 11/749,020 mailed Mar. 28, 2011, 11 pgs.

U.S. Office Action Response cited in U.S. Appl. No. 11/856,617 mailed Dec. 13, 2010, 16 pgs.

U.S. Office Action Response cited in U.S. Appl. No. 11/856,617 mailed May 23, 2011, 6 pgs.

U.S. Office Action Response cited in U.S. Appl. No. 11/856,636 mailed Feb. 1, 2011, 16 pgs.

U.S. Office Action Response in U.S. Appl. No. 11/952,890 mailed Jul. 8, 2011, 12 pgs.

U.S. Office Action Response mailed in U.S. Appl. No. 11/952,890 mailed Jan. 7, 2011, 15 pgs.

Chinese Third Office Action Decision on Rejection mailed in Application No. 200880002607.6 mailed Jul. 26, 2011, 17 pgs.

Chinese Office Action mailed in Application No. 200880015890.6 mailed Jul. 20, 2011, 10 pgs.

Chinese 2nd Office Action in Application 2008800026930 mailed Sep. 7, 2011, 9 pgs.

Chinese 2nd Office Action in Application 2007800065841 mailed Sep. 7, 2011, 9 pgs.

Chinese 2nd Office Action cited in Application Cn 200880002693.0 mailed Sep. 7, 2011, 7 pgs.

European Communication and Supplemental Search Report in Application No. 08 713 522.4 mailed Jul. 25, 2011, 9 pgs.

European Communication and Supplemental Search Report re Ep Application No. 08713521.6, mailed Jul. 20, 2011, 6 pgs.

Japanese Notice of Rejection in Application 2008545618 mailed Sep. 13, 2011, 4 pgs.
Notice of Allowance cited in U.S. Appl. No. 11/495,826 mailed Aug. 4, 2011, 8 pgs.
U.S. Office Action Response cited in U.S. Appl. No. 11/856,617 mailed Aug. 31, 2011, 7 pgs.
Notice of Allowance cited in U.S. Appl. No. 11/495,830 mailed Oct. 5, 2011, 7 pgs.
U.S. Office Action cited in U.S. Appl. No. 11/749,020 mailed Oct. 5, 2011, 18 pgs.
U.S. Office Action cited in U.S. Appl. No. 11/856,636 mailed Oct. 14, 2011, 15 pgs.
Japanese Notice of Rejection in JP Application 2008-556319, mailed Sep. 22, 2011, 7 pgs.

* cited by examiner

IDENTITY PROVIDERS IN DIGITAL IDENTITY SYSTEM

COPYRIGHT NOTICE

A portion of the disclosure of this patent document contains material that is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

BACKGROUND

Identity is an important component enabling interactions in everyday life. For example, an individual's credit card enables merchants to identify and allow the individual to purchase products and services on credit. The same is true in the digital world, where digital identities enable digital interactions. For example, digital identities can be used to authenticate parties to each other in the digital environment. Knowing with whom one is interacting is an important element in deciding whether or not to trust and provide information to a party.

An entity can use a digital identity to authenticate a party's identity or other personal information about the party. A digital identity can be issued by another entity, such as a trusted third party, and can include information about the party. Examples of such information include the party's name, address, social security number, age, telephone number, etc. A party can have multiple digital identities issued by one or more other entities, similar to that of an individual having a driver's license, a credit card, and a frequent flyer card.

In the online environment, a third party, such as an online service, can require that a party authenticate its identity before the third party allows the party to access goods or services. In order to authenticate its identity, the party can forward to the third party a digital identity in the form of a security token issued by another entity trusted by the third party. Once authentication is complete, the third party can provide access to the goods or services requested by the party.

In typical systems, it is necessary for the party to manually collect all of the security tokens required by the third party and then provide the information to the third party for authentication. In many cases, the party has little or no ability to control the contents of a security token issued by another entity. When the party shares a security token with a third party during authentication of the party's identity, the party's privacy can become a concern. For example, the party can unknowingly share personal information in the security token with the third party that the party does not need to share for authentication. In addition, the party can unknowingly provide personal information that the party does not want to share with the third party (e.g., social security number, telephone number, etc.).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect relates to a digital identity system including a principal including an identity selector programmed to receive a security policy from a relying party, review a plurality of digital identities associated with the principal, and request one or more claims related to an identity of the principal from an identity provider. The principal is further programmed to receive one or more security tokens including the claims from the identity provider, and to forward the security tokens to the relying party.

Another aspect relates to method for providing a digital identity, the method including: receiving a request for one or more claims related to an identity of a principal; providing the claims; transforming the claims; and generating a security token including the claims.

Another aspect relates to a computer-readable medium having computer-executable instructions for performing steps including: receiving a request for one or more claims related to an identity of a principal; providing the claims; transforming the claims; and generating a security token including the claims.

DESCRIPTION OF THE DRAWINGS

Reference will now be made to the accompanying drawings, which are not necessarily drawn to scale, and wherein.

DETAILED DESCRIPTION

Example embodiments will now be described more fully hereinafter with reference to the accompanying drawings. These embodiments are provided so that this disclosure will be thorough and complete. Like numbers refer to like elements throughout.

Example embodiments disclosed herein relate generally to digital identity systems including digital identities that can be exchanged between a first party and a second party to authenticate an identity and/or information related to the first party. In example embodiments herein, the first party can be an individual, a company, an organization, a computer or other device, a service, or any other type of entity. The first party is referred to herein as the principal. In example embodiments, the second party can be an individual, a company, an organization, a computer or other device, a service, or any other type of entity. The second party has goods, services, or other information that the principal desires to access and/or obtain. The second party is referred to herein as the relying party.

In example embodiments disclosed herein, digital identity systems enable the exchange of digital identities between parties across different subsystems using different technologies. Generally, the parties/subsystems of these example digital identity systems can include one or more of the following attributes:

security policies—the ability to specify a set of claims required by a relying party and the issuer of such claims in order to authenticate a principal's identity;

negotiation—the ability for the various parties of the digital identity system to make agreements regarding mutually acceptable technologies, claims, and other requirements;

encapsulation—the ability to exchange requirements and claims in a technology-neutral way between parties/subsystems; and transformation—the ability to translate claims between technologies and semantically.

One or more of these attributes can be found in the digital identity systems described below.

Figure 1:
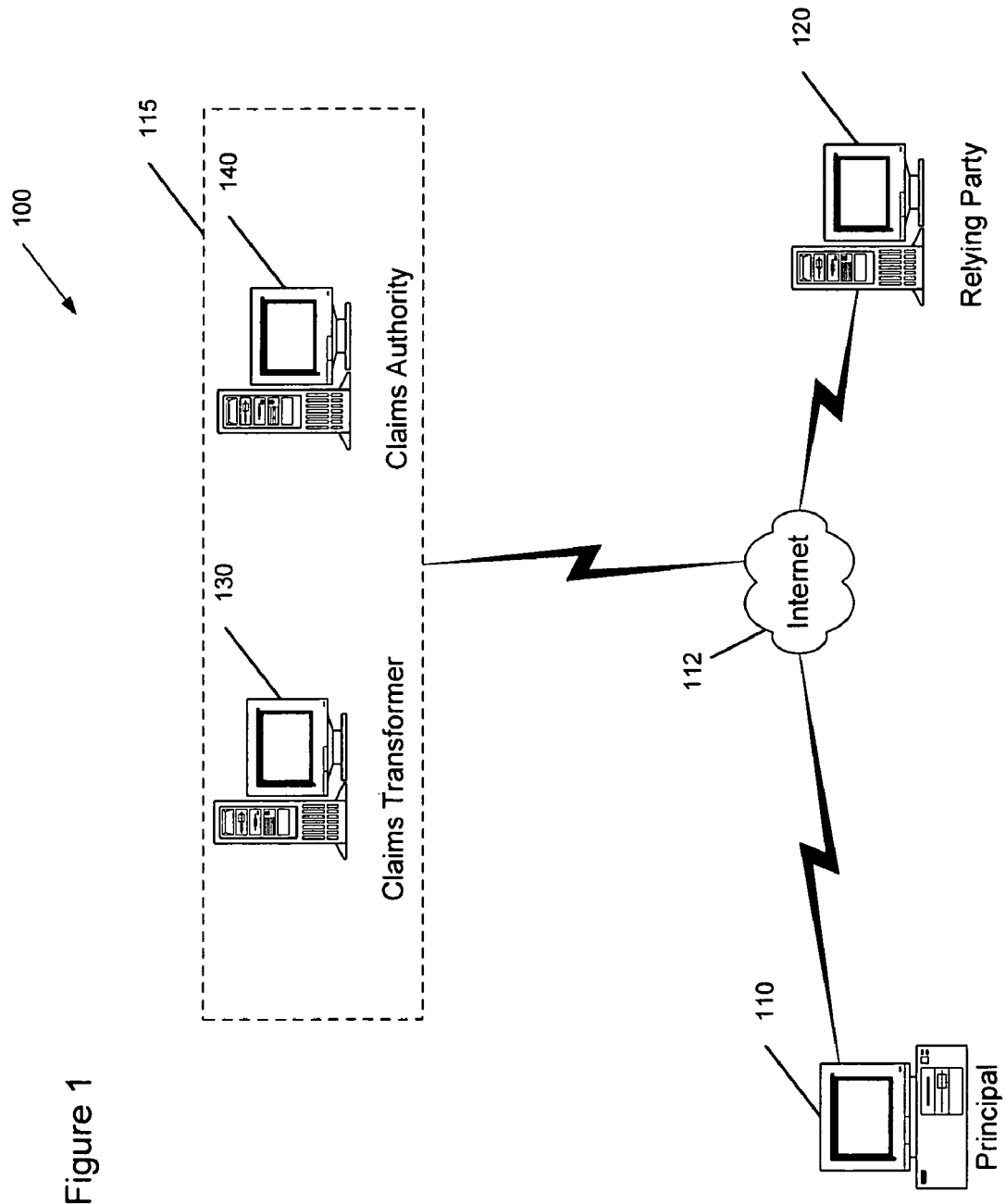
FIG. 1 illustrates an example digital identity system including a principal, a relying party, and an identity provider.

Referring now to FIG. 1, an example digital identity system 100 is shown including a principal 110 and a relying party 120. Principal 110 and relying party 120 can communicate with each other over one or more networks, such as the Internet 112. In example embodiments, principal 110 can request goods, services, or other information from relying party 120. Relying party 120 can require authentication of the identity of or information about principal 110 before or in conjunction with providing the requested goods, services, or information to principal 110.

Also shown in FIG. 1 is an example identity provider 115 including a claims transformer 130 and a claims authority 140. The claims transformer 130 is sometimes referred to as a "security token service." In the example shown, identity provider 115 can provide one or more claims about principal 110. A claim is a statement or assertion made about the principal related to the principal's identity or information about the principal such as, for example, name, address, social security number, age, etc. As described further below, identity provider I 15 can provide claims to principal 110 and/or relying party 120 in the form of a signed security token. In example embodiments, identity provider 115 is in a trusted relationship with relying party 120, so that relying party 120 trusts the claims in the signed security token from identity provider 115.

Although claims transformer 130 and claims authority 140 of identity provider 115 are shown as separate entities in FIG. 1, in alternative embodiments claims transformer 130 and claims authority 140 can be the same entity or different entities.

In example embodiments disclosed herein, system 100 is implemented as an InfoCard system provided in the WINFX application programming interface developed by Microsoft Corporation of Redmond, Wash. The InfoCard system allows principals to manage multiple digital identities from various identity providers.

The InfoCard system utilizes a web services platform such as the Windows Communication Foundation in the WINFX application programming interface. In addition, the InfoCard system is built using the Web Services Security Specifications propagated at least in part by Microsoft Corporation of Redmond, Wash. These specifications include a message security model WS-Security, an endpoint policy WS-SecurityPolicy, a metadata protocol WS-MetadataExchange, and a trust model WS-Trust. Generally, the WS-Security model describes how to attach security tokens to messages. The WS-SecurityPolicy model describes end point policy requirements, such as required security tokens and supported encryption algorithms. Such policy requirements can be conveyed and negotiated using a metadata protocol defined by WS-MetadataExchange. The WS-Trust model describes a framework for trust models that enables different web services to interoperate.

Example embodiments described herein refer to the Web Services Security Specifications described above. In alternative embodiments, one or more other specifications can be used to facilitate communications between the various subsystems in system 100.

In example embodiments, principal 110, relying party 120, and identity provider 115 can each utilize one or more a computer systems. Each computer system includes one or more of volatile and non-volatile computer readable media. Computer readable media includes storage media, as well as removable and non-removable media implemented in any method or technology for storage of information such as computer readable instructions, data structures, program modules or other data. The computer system also includes communication media that typically embodies computer readable instructions, data structures, program modules or other data in a modulated data signal such as a carrier wave or other transport mechanism and includes any information delivery media. Communication media includes wired media such as a wired network or direct-wired connection, and wireless media such as acoustic, RF, infrared and other wireless media. Combinations of any of the above should also be included within the scope of computer readable media.

The computer system includes an operating system, such as the WINDOWS operating system from Microsoft Corporation, and one or more programs stored on the computer readable media. The computer system also includes one or more input and output communications devices that allow the user to communicate with the computer system, as well as allow the computer system to communicate with other devices. Communications between the computer systems used by principal 110, relying party 120, and identity provider 115 can be implemented using wired and/or wireless technologies.

Figure 2:
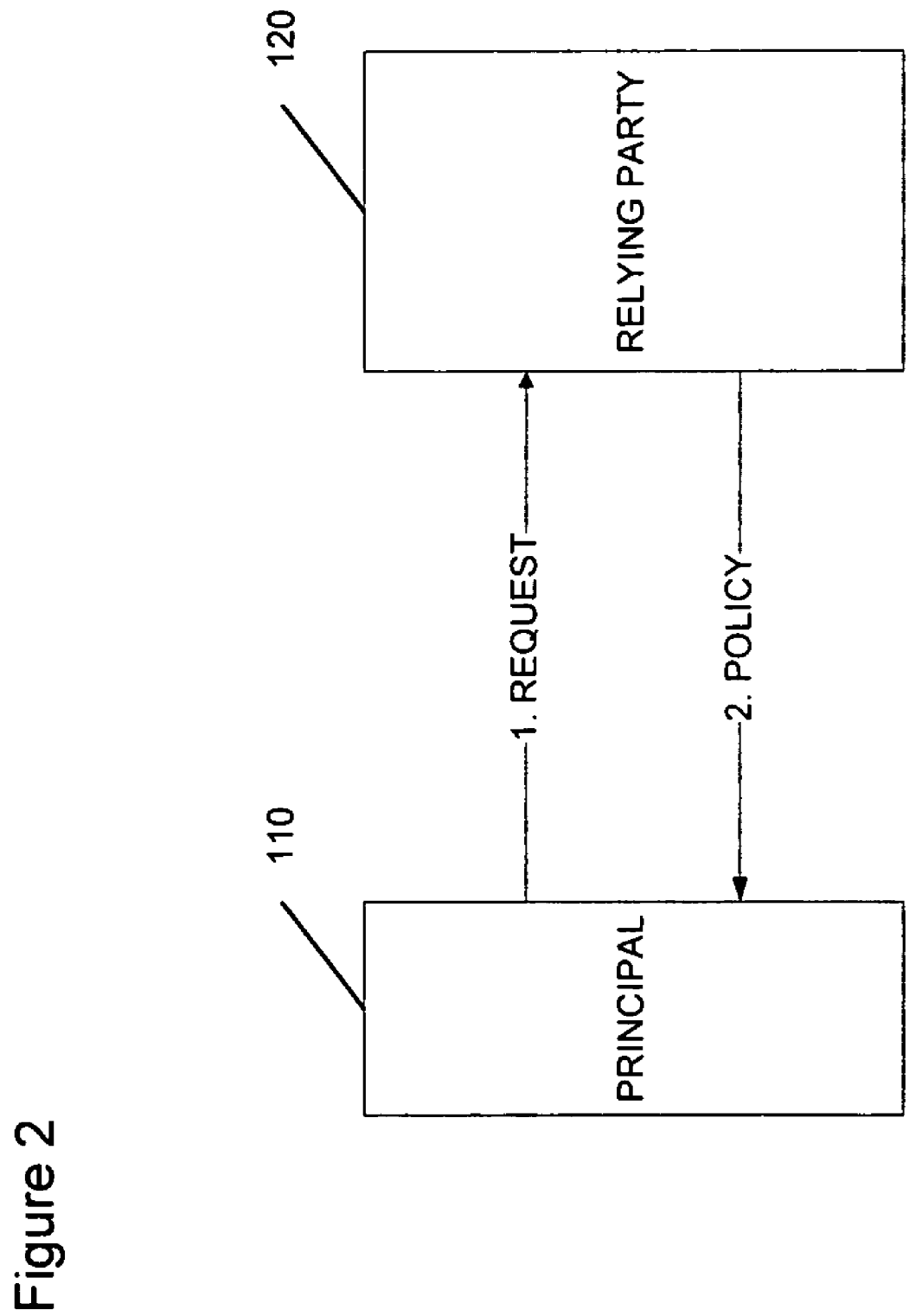
FIG. 2 illustrates a portion of the system of FIG. 1.

Referring now to FIG. 2, example principal 110 and relying party 120 are again shown. In the example shown, principal 110 sends a request to relying party 120 for goods, services, or other information. For example, in one embodiment, principal 110 sends a request to relying party 120 for access to information from relying part 120 that principal 110 desires.

The request sent by principal 110 can include a request for the authentication requirements of relying party 120 using, for example, the mechanisms provided in WS-MetadataExchange. In response to the request, relying party 120 sends principal 110 requirements for relying party 120 to authenticate its identity or other information about principal 110. The requirements of relying party 120 for authentication are referred to herein as a security policy. The security policy defines the set of claims from a trusted identity provider that the principal 110 must provide to relying party 120 for relying party 120 to authenticate principal 110.

In one example, relying party 120 specifies its security policy using WS-SecurityPolicy, including both the claim requirements and type of security token required by relying party 120. A basic form for a security policy in accordance with WS-SecurityPolicy is illustrated in the example below.

```
<sp:IssuedToken ...>
    <sp:RequestSecurityTokenTemplate>
        <wst:TokenType>
            urn:oasis:names:tc:SAML:1.0:assertion
        </wst:TokenType>
        <wst:Claims
            wst:Dialect="http://schemas.microsoft.com/ws/2005/05/
            identity">
            <ic:Claim
```

-continued

```
        URI="http://.../ws/2005/05/identity/claims/givenname"/>
    <wst:Claims>
  </sp:RequestSecurityTokenTemplate>
</sp:IssuedToken>
```

In this example, one claim regarding the given name of the principal is required by the security policy for authentication. Examples of other types of claims include, without limitation, the following:

First Name—Type: xs:string—preferred name or first name of a subject;
Last Name—Type: xs:string—surname or family name of a subject;
Email Address—Type: xs:string—preferred address for the "To:" field of email to be sent to the subject, usually of the form <user>@<domain>;
Street Address—Type: xs:string—street address component of a subject's address information;
Locality Name or City—Type: xs:string—locality component of a subject's address information;
State or Province—Type: xs:string—abbreviation for state or province name of a subject's address information;
Postal Code—Type: xs:string—postal code or zip code component of a subject's address information;
Country—Type: xs:string—country of a subject;
Primary or Home Telephone Number—Type: xs:string—primary or home telephone number of a subject;
Secondary or Work Telephone Number—Type: xs:string—secondary or work telephone number of a subject;
Mobile Telephone Number—Type: xs:string—mobile telephone number of a subject;
Date of Birth—Type: xs:date—the date of birth of a subject in a form allowed by the xs:date data type;
Gender—Type: xs:token—gender of a subject that can have any of these exact string values—"Male," "Female" or "Unspecified;" and
Private Personal Identifier—Type: xs:base64binary—indicates a private identifier that identifies the subject to a relying party.

The security policy can also be used to specify the type of security token required by relying party 120, or a default type can be used as determined by the identity provider. For example, the above-noted policy specifies a certain type of security token that is required by relying party 120 (see the "wst:TokenType" element).

In addition to specifying the required claims and token type, the security policy can specify a specific identity provider required by the relying party (see the "sp:Issuer" element), as shown below.

```
<sp:IssuedToken sp:Usage="xs:anyURI"
sp:IncludeToken="xs:anyURI" ...>
    <sp:Issuer>
        <!-- Identity provider's service endpoint -->
    </sp:Issuer>
    <sp:RequestSecurityTokenTemplate>
        ...
    </sp:RequestSecurityTokenTemplate>
    <wsp:Policy>
        ...
    </wsp:Policy>
    ...
</sp:IssuedToken>
```

The policy can omit this element, leaving the determination of the appropriate identity provider up to principal 110. Other elements can be specified in the security policy as well such as, for example, the freshness of the required security token.

In some embodiments, principal 110 can require that relying party 120 identify itself to principal 110 so that principal 110 can decide whether or not to satisfy the security policy of relying party 120, as described below. In one example, relying party 120 identifies itself using an X509 certificate. In other embodiments, relying party 120 can identify itself using other mechanisms such as, for example, a Secure Sockets Layer ("SSL") server certificate.

For example, in one embodiment, endpoint verification of relying party 120 is provided using the provisions in WS-Addressing, such as the "wsid:Identity" element in the example X509v3 certificate shown below:

```
<wsa:EndpointReference>
    <wsa:Address>http://...</wsa:Address>
    <wsid:Identity>
        <ds:KeyInfo>
            <ds:X509Data>
                <ds:X509Certificate>...</ds:X509Certificate>
            </ds:X509Data>
        </ds:KeyInfo>
    </wsid:Identity>
</wsa:EndpointReference>
```

Figure 3:
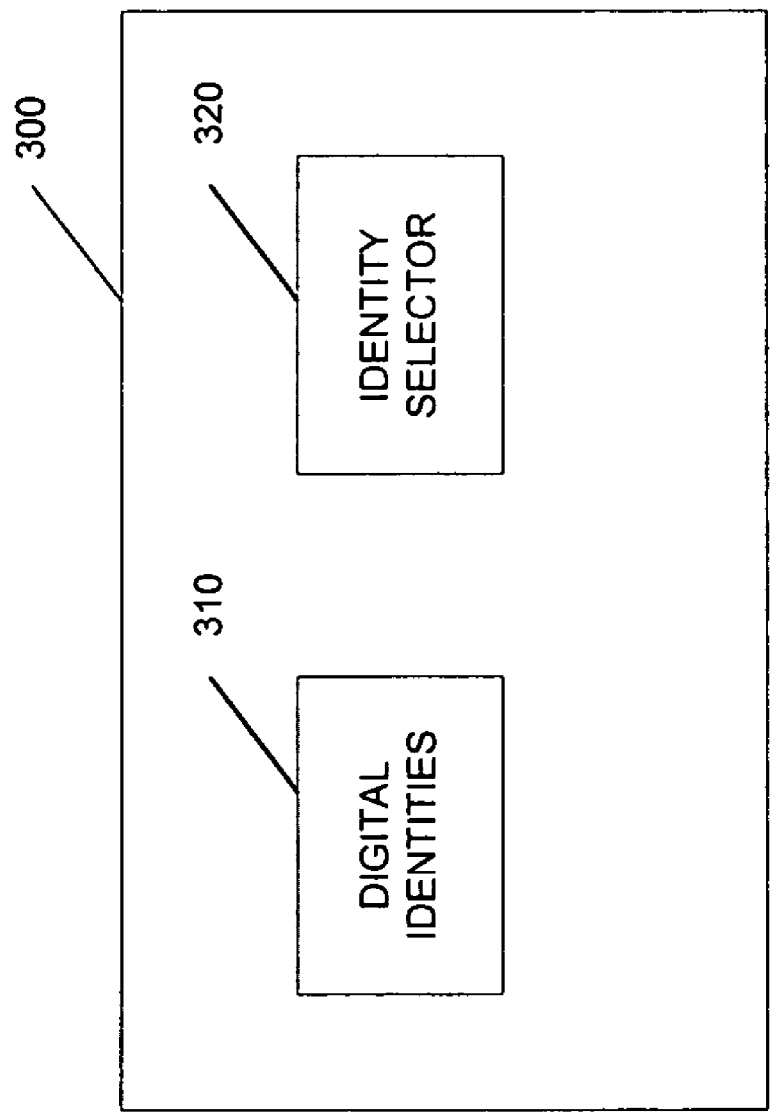
FIG. 3 illustrates an example computer system of the principal of FIG. 1 programmed to review and select one of a plurality of digital identities.

Referring now to FIG. 3, an example computer system 300 of principal 110 includes one or more digital identities 310 for principal 110. These digital identities 310 (sometimes referred to as "InfoCards" in the InfoCard system provided in the WINFX application programming interface developed by Microsoft Corporation of Redmond, Wash.) are artifacts that represent the token issuance relationship between principal 110 and a particular identity provider, such an identity provider 115. In the examples shown, each digital identity 310 corresponds to a particular identity provider, and principal 110 can have multiple digital identities 310 from the same or different identity providers.

Digital identities 310 can include, among other information, the identity provider's issuance policy for security tokens, including the type of tokens that can be issued, the claim types for which it has authority, and/or the credentials to use for authentication when requesting security tokens. In example embodiments, digital identities 310 are represented as XML documents that are issued by identity providers 115 and stored by principals 110 on a storage device such as computer system 300. An example format for a digital identity 310 is provided below.

```
<ic:InfoCard xml:lang="xs:language"? ...>
    <ic:InfoCardReference>
        <ic:CardId> xs:anyURI </ic:CardId>
        <ic:CardVersion> xs:unsignedInt </ic:CardVersion> ?
    </ic:InfoCardReference>
    <ic:CardName> xs:string </ic:CardName> ?
    <ic:CardImage MimeType=
"xs:string"> xs:base64Binary </ic:CardImage> ?
    <ic:IssuerName> xs:string </ic:IssuerName>
    <ic:TimeIssued> xs:dateTime </ic:TimeIssued>
    <ic:TimeExpires> xs:dateTime </ic:TimeExpires> ?
    <ic:TokenServiceReference>
        (<ic:TokenService>
            <wsa:EndpointReference ...> ... </wsa:EndpointReference>
            <ic:CredentialHint>xs:string</ic:CredentialHint> ?
            (
```

-continued

```
        <ic:UserNamePasswordAuthenticate>...
        </ic:UserNamePass
    wordAuthenticate> |
        <ic:KerberosV5Authenticate>...
        </ic:KerberosV5Authenticate> |
        <ic:X509V3Authenticate>...
        </ic:X509V3Authenticate> |
        <ic:SelfIssuedAuthenticate>...
        </ic:SelfIssuedAuthenticate>
        )
    </ic:TokenService>) +
</ic:TokenServiceReference>
<ic:InfoCardPolicy>
    <ic:SupportedTokenTypes>
        <ic:TokenType URI="xs:anyURI" /> +
    </ic:SupportedTokenTypes>
    <ic:SupportedClaims>
        (<ic:SupportedClaim URI="xs:anyURI">
            <ic:DisplayTag> xs:string </ic:DisplayTag> ?
            <ic:Description> xs:string </ic:Description> ?
        </ic:SupportedClaim>) +
    </ic:SupportedClaims>
    <ic:RequireAppliesTo /> ?
</ic:InfoCardPolicy>
    ...
</ic:InfoCard>
```

The following describes the elements/attributes of the digital identity format shown above:

/ic:InfoCard—an InfoCard issued by an identity provider;

/ic:InfoCard/@xml:lang—an optional language identifier, using the language codes specified in [RFC 3066];

/ic:InfoCard/ic:InfoCardReference—a specific reference for the InfoCard that should be used in future requests for security tokens from the identity provider based on that InfoCard;

/ic:InfoCard/ic:InfoCardReference/ic:CardId—this element provides a globally unique identifier in the form of a URI for the specific InfoCard;

/ic:InfoCard/ic:InfoCardReference/ic:CardVersion—this optional element provides a versioning epoch for the InfoCard issuance infrastructure used by the identity provider;

/ic:InfoCard/ic:CardName—this optional element provides a friendly textual name for the issued InfoCard;

/ic:InfoCard/ic:CardImage—this optional element contains a base64 encoded inline image that provides a graphical image for the issued InfoCard that can be displayed in user interfaces;

/ic:InfoCard/ic:CardImage/@MimeType—this attribute provides a MIME type specifying the format of the included logo image;

/ic:InfoCard/ic:IssuerName—this element provides a friendly name for the issuer of the InfoCard;

/ic:InfoCard/ic:TimeIssued—this element provides the date and time when the InfoCard was issued;

/ic:InfoCard/ic:TimeExpires—this optional element provides the date and time after which the InfoCard should be treated as expired and invalid;

/ic:InfoCard/ic:TokenServiceReference—this element provides an ordered list of child elements that specify the security token service endpoints, the corresponding authentication method and credentials needed to request security tokens;

/ic:InfoCard/ic:TokenServiceReference/ic:TokenService—this element provides a security token service reference;

/ic:InfoCard/ic:TokenServiceReference/ic:TokenService/wsa:EndpointReference—this element provides the endpoint reference for the security token service;

/ic:InfoCard/ic:TokenServiceReference/ic:TokenService/ic:CredentialHint—this optional element provides a hint (string) to be displayed to the user to help provide the right credential;

/ic:InfoCard/ic:TokenServiceReference/ic:TokenService/<credential selector element>—this element provides an unambiguous description of the credentials to use for authenticating to the security token service, with example credential types including Kerberos, X509, or self-issued credentials;

/ic:InfoCard/ic:InfoCardPolicy—this element provides the token issuance policy of the identity that allows a principal to determine if the InfoCard satisfies a relying party's token requirements in a given interaction;

/ic:InfoCard/ic:InfoCardPolicy/ic:SupportedTokenTypes—this element contains the list of token types, as child elements, that the identity provider can issue;

/ic:InfoCard/ic:InfoCardPolicy/ic:SupportedTokenTypes/ic:TokenType (one or more)—this element indicates an individual token type that is supported;

/ic:InfoCard/ic:InfoCardPolicy/ic:SupportedClaims—this element contains the list of claim types, as child elements, that the identity provider can provide in security tokens;

/ic:InfoCard/ic:InfoCardPolicy/ic:SupportedClaims/ic:SupportedClaim (one or more)—this element indicates an individual claim type that is supported; and /ic:InfoCard/ic:InfoCardPolicy/ic:RequireAppliesTo—this optional empty element indicates that the service requester (InfoCard system) must submit the relying party identity to the identity provider.

An example digital identity is provided below.

```
<InfoCard
    xmlns="http://schemas..."
    xmlns:wsa="http://schemas.xmlsoap.org/ws/2004/08/addressing"
    xmlns:wsp="http://schemas.xmlsoap.org/ws/2002/12/policy"
    xml:lang="en-us">
    <InfoCardReference>
        <CardId>http://...</CardId>
    </InfoCardReference>
    <CardName>...</CardName>
    <CardImage MimeType="image/gif"> ... </CardImage>
    <IssuerName>XYZ Identity Provider</IssuerName>
    <TimeIssued>2003-08-24T00:30:05Z</TimeIssued>
    <TokenServiceReference>
        <TokenService>
            <wsa:EndpointReference>
                <wsa:Address>http://...</wsa:Address>
                <wsid:Identity>
                    <ds:KeyInfo>
                        <ds:X509Data>
                            <ds:X509Certificate>...</ds:X509Certificate>
                        </ds:X509Data>
                    </ds:KeyInfo>
                </wsid:Identity>
            </wsa:EndpointReference>
            <UserNamePasswordAuthenticate>
                <Username>...</Username>
            </UserNamePasswordAuthenticate>
        </TokenService>
    </TokenServiceReference>
    <ic:InfoCardPolicy>
        <SupportedTokenTypes>
            <TokenType URI=
                "urn:oasis:names:tc:SAML:1.0:assertion"/>
        </SupportedTokenTypes>
        <SupportedClaims>
            <SupportedClaim
                URI="http://.../ws/2005/05/identity/claims/givenname">
                <DisplayTag>Given Name</DisplayTag>
```

```
        </SupportedClaim>
        <SupportedClaim
    URI="http://.../ws/2005/05/identity/
    claims/surname"><DisplayTag>Last
    Name</DisplayTag>
        </SupportedClaim>
      </SupportedClaims>
      <RequireAppliesTo />
  </ic:InfoCardPolicy>
</InfoCard>
```

In the example above, the digital identity is issued by "XYZ Identity Provider," and the digital identity states that XYZ Identity Provider supports the Security Assertion Markup Language ("SAML") token type ("SupportedTokenTypes" element) provided in accordance with the SAML standard promulgated by the Organization for the Advancement of Structured Information Standards ("OASIS"). In addition, the digital identity states that XYZ Identity Provider can provide two claims ("SupportedClaims" element—including "givenname" and "surname"), requires the relying party's identity be included in the token request ("RequireAppliesTo" element), and requires authentication based on username/password when requesting security tokens ("UserNamePasswordAuthenticate" element).

Digital identities 310 can be issued to principal 110 using a variety of methods. For example, in some embodiments, principal 110 can request a digital identity 310 over a hypertext transfer protocol connection, or digital identities 310 can be emailed from identity provider 115 to principal 110. In example embodiments, identity provider 115 signs each digital identity 310 sent to principal 110 so that principal 110 can verify that the digital identity 310 is from identity provider 115.

Computer system 300 also includes an identity selector 320. Generally, identity selector 320 selects between one or more digital identities 310 of principal 110 on computer system 300 to request and obtain security tokens from one or more identity providers, such as identity provider 115. For example, as described further below, when a security policy from relying party 120 is received by computer 300, identity selector 320 is programmed to identify one or more digital identities 310 that satisfy one or more of the claims required by the security policy using the information in digital identities 310. In one embodiment, identity selector 320 presents the one or more relevant digital identities 310 to principal 110, and principal 110 can decide whether or not to use digital identities 310.

Figure 4:
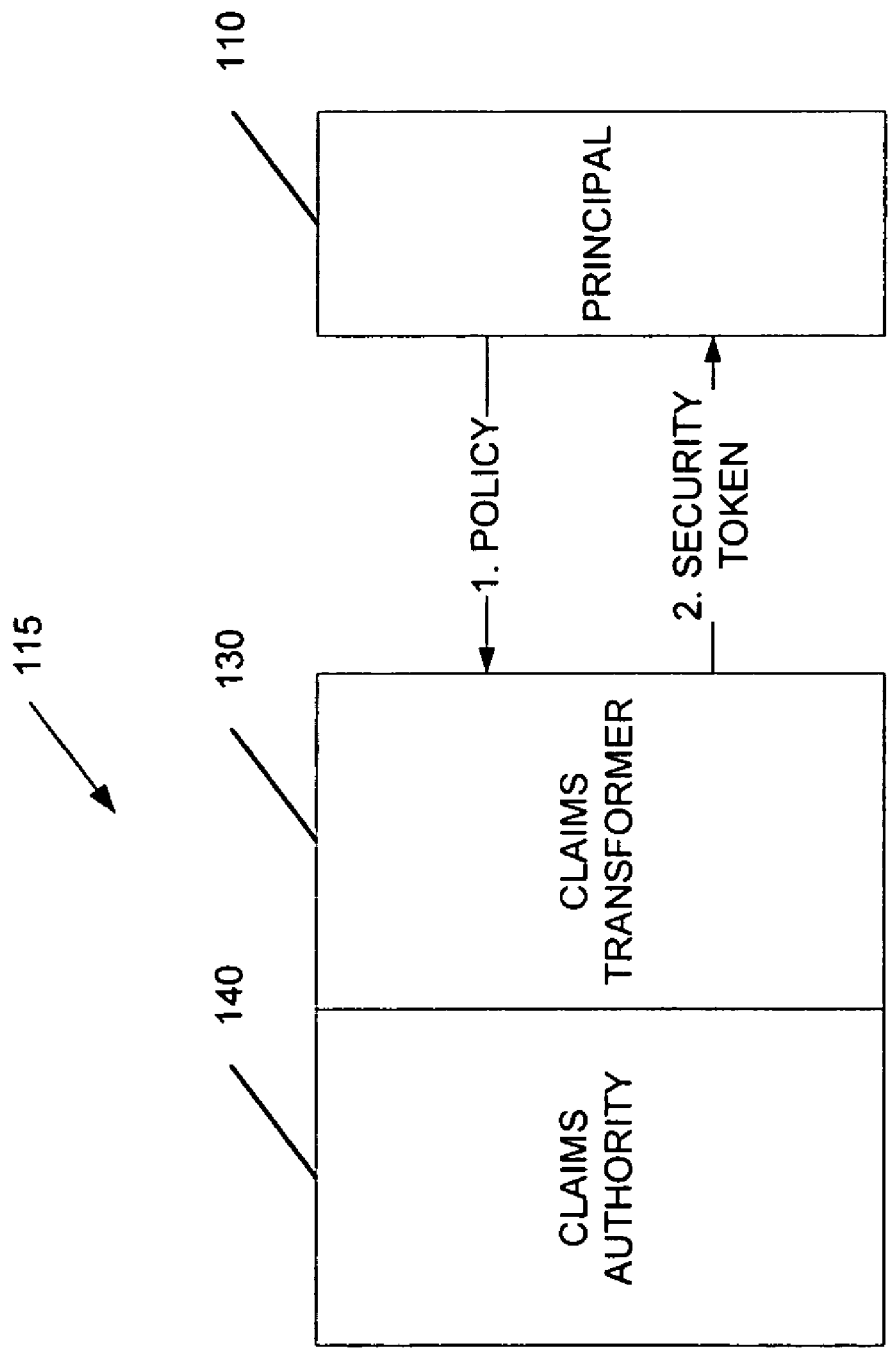
FIG. 4 illustrates another portion of the system of FIG. 1.

Referring now to FIG. 4, once principal 110 receives the security policy from relying party 120, principal 110 can communicate with (using, for example, computer 300) one or more identity providers to gather the claims required by the policy. In the example shown, principal 110 communicates the requirements of the security policy to identity provider 115.

In example embodiments, principal 110 requests one or more security tokens from identity provider 115 using the issuance mechanism described in WS-Trust. In one example, principal 110 forwards the claim requirements in the policy of relying party 120 to identity provider 115. The identity of relying party 120 can, but need not, be specified in the request sent by principal 10 to identity provider 115 (see the "RequireAppliesTo" element in the example digital identity described above). The request can include other requirements as well, such as a request for a display token, as described further below.

An example of a request for a security token is provided below.

```
<wst:RequestSecurityToken>
    <wst:TokenType>
        urn:oasis:names:tc:SAML:1.0:assertion
    </wst:TokenType>
    <wst:Claims
        wst:Dialect="http://schemas.microsoft.com/ws/2005/05/
        identity">
      <ic:Claim
        URI="http://.../ws/2005/05/identity/claims/givenname"/>
    </wst:Claims>
</wst:RequestSecurityToken>
```

In another example below, instead of requesting specific claims from identity provider 115, principal 110 can simply provide a reference to one of its digital identities 310 issued by identity provider 115 in its request.

```
<wst:RequestSecurityToken>
    ...
    <ic:InfoCardReference>
        <ic:CardId>http://xyz.com/CardId/
        d795621fa01d454285f9</ic:CardId>
            <ic:CardVersion>1</ic:CardVersion>
    </ic:InfoCardReference>
    ...
</wst:RequestSecurityToken>
```

In example embodiments, identity provider 115 has its own security policy as specified in WS-SecurityPolicy and can require authentication of principal 110 before identity provider 115 forwards a security token to principal 110.

Generally, claims authority 140 of identity provider 115 can provide one or more of the claims required by the policy from relying party 120. For example, claims authority 140 is programmed to generate one or more claims request by principal 110. Claims transformer 130 of identity provider 115 is programmed to transform the claims and to generate one or more signed security tokens 150 that include the claims.

In example embodiments, claims transformer 130 is programmed to generate a security token that can be understood by relying party 120. As noted above, principal 110 can request a security token in a certain format (see the "wst:TokenType" element in the example request provided above) in its request to identity provider 115, based on requirements from relying party 120 (see the "wst:TokenType" element in the example security policy provided above). Claims transformer 130 can be programmed to generate security tokens in one of a plurality of formats including, without limitation, X509, Kerberos, SAML (versions 1.0 and 2.0), Simple eXtensible Identity Protocol ("SXIP"), etc.

For example, in one embodiment, claims authority 140 is programmed to generate claims in a first format A, and the security policy of relying party 120 requires a security token in a second format B. Claims transformer 130 can transform the claims from claims authority 140 from format A into format B before sending security token 150 to principal 110.

In addition, claims transformer 130 can be programmed to refine the semantics of a particular claim. In example embodiments, the semantics of a particular claim are transformed to minimize the amount of information provided in a particular claim and/or security token to reduce or minimize the amount of personal information that is conveyed by a given claim.

For example, in one embodiment, the security policy of relying party 120 requires a claim stating that principal 110 is over 21 years of age. When this requirement is communicated to identity provider 115, claims authority 140 is programmed to provide a claim of the actual age of principal 110 (e.g., "Birth Date =Jan. 1, 1966"). When this claim is provided to claims transformer 130, claims transformer 130 transforms the semantics of the claim from the actual birth date of principal 110 to a claim that principal 110 is over 21 years of age (e.g., "Age>21=TRUE"). In this manner, when this claim is packaged into security token 150 that is forwarded through principal 110 to relying party 120, less personal information about principal 110 is shared with relying party 120, while the requirements of relying party 120 are still met.

Once security token 150 is generated by claims transformer 130 of identity provider 115, security token 150 can be forwarded to principal 110. In example embodiments, claims transformer 130 forwards the security token 150 to principal 110 using the response mechanisms described in WS-Trust. In one embodiment, claims transformer 130 includes a security token service (sometimes referred to as an "STS") such as that disclosed in U.S. patent application Ser. No. 10/436,880 filed on May 12, 2003, the entirety of which is hereby incorporated by reference.

Figure 5:
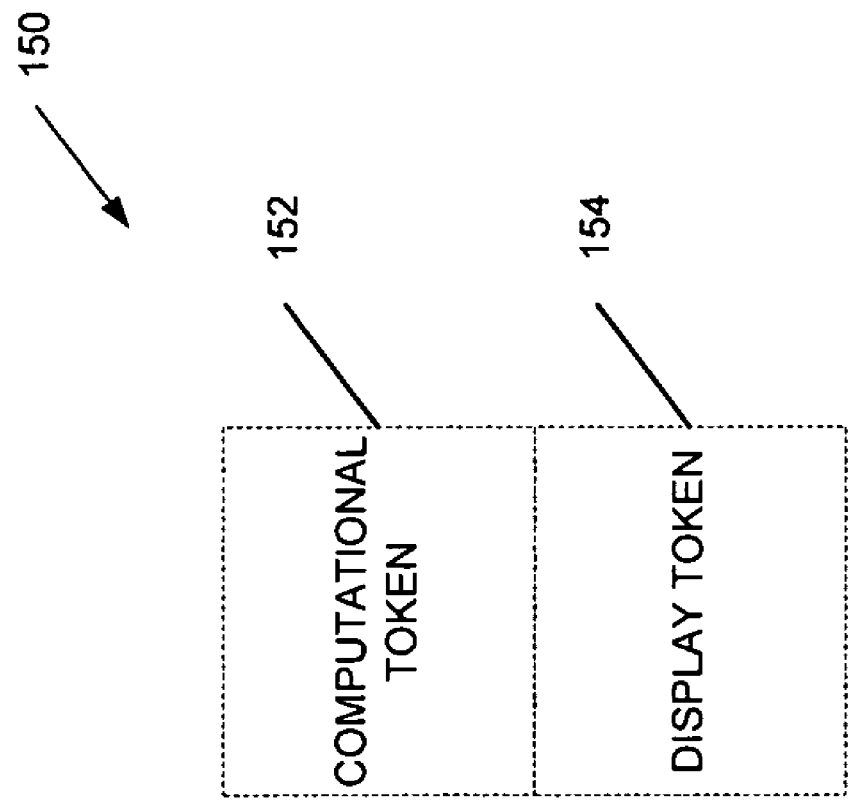
FIG. 5 illustrates an example security token.

Referring now to FIG. 5, an example security token 150 is shown. In the embodiment shown, security token 150 includes a computational token 152 and a display token 154. Computational token 152 includes the claims provided by identity provider 115 in an encrypted format. Claims transformer 130 generates computational token 152 in an encrypted format that can be understood (i.e., decrypted) by relying party 120.

Claims transformer 130 also generates display token 154. Generally, display token 154 includes at least a summary of the claims that are included in computational token 152 of security token 150. For example, in some embodiments, display token 154 includes a list of all of the claims included in computational token 152. Display token 154 can be generated in a format that can be reviewed by principal 110 using, for example, computer system 300. In some examples, display token 154 is generated in a plain text format or a hypertext markup language format. One example of a display token included as part of a security token response is shown below.

```
<ic:RequestedDisplayToken>
    <ic:DisplayToken xml:lang="en-us">
        <ic:DisplayClaim
    URI="http://.../ws/2005/05/identity/claims/givenname">
            <ic:DisplayTag>Given Name</ic:DisplayTag>
            <ic:DisplayValue>John</ic:DisplayValue>
        </ic:DisplayClaim>
        <ic:DisplayClaim URI="http://.../ws/2005/05/identity/claims/
        surname">
            <ic:DisplayTag>Last Name</ic:DisplayTag>
            <ic:DisplayValue>Doe</ic:DisplayValue>
        </ic:DisplayClaim>
    <ic:DisplayToken>
</ic:RequestedDisplayToken>
```

The following is a general description of the elements shown above in the display token:

- /ic:RequestedDisplayToken/ic:DisplayToken—the returned display token;
- /ic:RequestedDisplayToken/ic:DisplayToken/@xml: lang—this attribute indicates a language identifier, using the language codes specified in RFC 3066, in which the display token content is localized;
- /ic:RequestedDisplayToken/ic:DisplayToken/ic:Display-Claim—this element indicates an individual claim returned in the security token;
- /ic:RequestedDisplayToken/ic:DisplayToken/ic:Display-Claim/@URI—this attribute provides the unique identifier (URI) of the individual claim returned in the security token;
- /ic:RequestedDisplayToken/ic:DisplayToken/ic:Display-Claim/ic:DisplayTag—this optional element provides a common or friendly name for the claim returned in the security token;
- /ic:RequestedDisplayToken/ic:DisplayToken/ic:Display-Claim/ic:Description—this optional element provides a description of the semantics for the claim returned in the security token;
- /ic:RequestedDisplayToken/ic:DisplayToken/ic:Display-Claim/ic:DisplayValue—this optional element provides one or more displayable values for the claim returned in the security token; and
- /ic:RequestedDisplayToken/ic:DisplayToken/ic:Display-TokenText (not shown)—this optional element provides an alternative textual representation of the entire token as a whole when the token content is not suitable for display as individual claims.

In some embodiments, security token 150 including computational token 152 is issued in accordance with the SAML standard. For example, security token 150 can be issued in accordance with SAML 1.1 or SAML 2.0 standards. Other standards can also be used such as, for example and without limitation, an X.509 certificate and a Kerberos ticket.

In addition, security token 150 can be cryptographically signed or endorsed by claims transformer 130 using a known algorithm. In one embodiment, for example and without limitation, a 2048-bit asymmetric Rivest-Shamir-Adleman ("RSA") key is used. In other embodiments, other encryption algorithms can be used such as, for example, a base64 encoded symmetric encryption key. In one embodiment, a symmetric key is used by default. In this manner, in the example shown, a party such as relying party 120 can cryptographically verify that security token 150 originated from identity provider 115.

In example embodiments, computational token 152 is cryptographically bound to display token 154 using one or more known algorithms such as a digital signature over the entire response message from the claims authority containing both the computational token 152 and the display token 154.

In example embodiments, a display token is provided by default in each security token issued by a claims transformer. In other embodiments, a display token is provided only if the principal requests the display token. An example of such a display token request included in a security token request is as follows.

```
<wst:RequestSecurityToken>
    <ic:RequestDisplayToken LangId="en-us" />
</wst:RequestSecurityToken>
```

The optional attribute "LangId" indicates a language identifier for the display token using language codes specified in RFC 3066.

In example embodiments, a principal can review the display information from the display token and decide whether or not to forward the security token to a relying party. In other embodiments, the principal can review the display information, but does not have the option to stop the forwarding of the security token to the relying party. In other words, once the security token is requested by the principal, the security token is automatically forwarded to the relying party once the security token is received by the principal.

In example embodiments, if a security token lacks a display token, the principal is notified of the lack of the display token, and the principal can decide whether or not to forward the security token to the relying party. In other embodiments, if no display token is provided, no display information is presented to the principal.

In example embodiments, only the computational token portion of a security token is forwarded by the principal to the relying party. In other embodiments, the principal forwards the entire security token including both the computational token and the display token to the relying party.

Additional details about example embodiments of security tokens including display tokens can be found in U.S. patent application Ser. No. 11/312,920, filed on Dec. 19, 2005, the entirety of which is hereby incorporated by reference.

Figure 6:
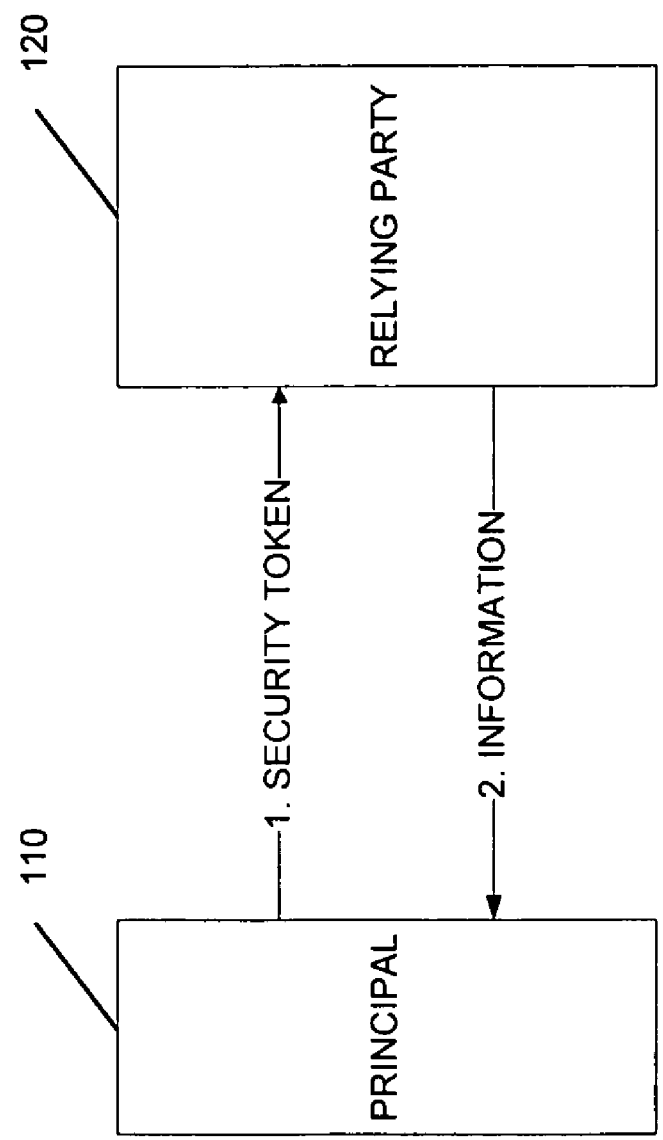
FIG. 6 illustrates another portion of the system of FIG. 1.

Referring now to FIG. 6, principal 110 can forward security token 150 to relying party 120 to satisfy all or a part of the security policy of relying party 120. In one example, principal 110 can forward security token 150 to relying party 120 by binding security token 150 to an to application message using the security binding mechanisms described in WS-Security.

Once relying party 120 receives security token 150, relying party 120 can cryptographically verify the origin of signed security token 150. Relying party 120 can also utilize the claims in computation token 152 of security token 150 to satisfy the security policy of relying party 120 to authenticate principal 110. Once authentication is complete, relying party 120 can provide access to the goods, services, or other information requested by principal 110.

In exampled disclosed herein, communication between principal 110, relying party 120, and identity provider 115 can be conducted in a technology-neutral fashion. For example, the embodiments disclosed herein use the mechanisms provided in WS-MetadataExchange and WS-SecurityPolicy to facilitate communication between components using different technologies and communication protocol formats. In this manner, the various components in digital identity system 100 can communicate with one another.

Figure 7:
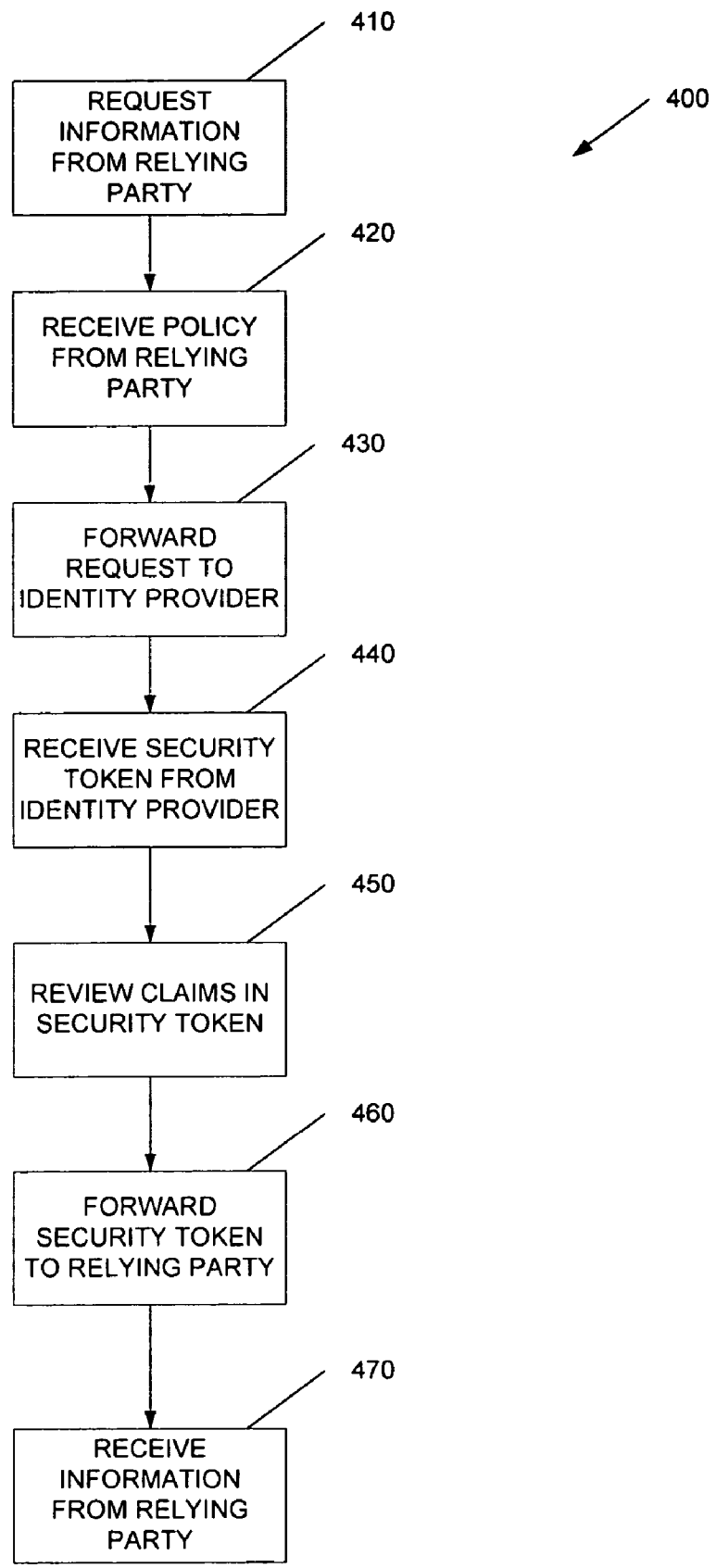
FIG. 7 illustrates an example method for authentication.

Referring now to FIG. 7, an example method 400 for authenticating a principal is shown. Method 400 is described with reference to a non-limiting example in which the principal is Employee A. Employee A is an employee of a company referred to as "Company A," and the relying party is a travel agency referred to as "Travel Agency A." Company A has partnered with Travel Agency A for making travel arrangements for employees of Company A at discounted rates.

At operation 410 of method 400, a principal requests information from a relying party. In the example embodiment, Employee A utilizes an application program on Employee A's computer to request travel arrangements from the web site of Travel Agency A. Next, at operation 420, Employee A's computer receives the security policy from the web site of Travel Agency A. This policy requires that Employee A submit a security token with a claim establishing that Employee A is an employee of Company A before Employee A can access the discounted travel arrangements on the web site of Travel Agency A.

At operation 430, Employee A's computer forwards a request based on the security policy to an identity provider, which in the present example is a security token service or STS operated by Company A. The STS of Company A can issue a security token with a claim establishing that Employee A is an employee of Company A. For example, the claim can be "Is Employee of Company A=True." Next, at operation 440, Employee A's computer receives a signed security token from the STS of Company A. The security token includes a computational token and a display token, with the computational token including the claim establishing that Employee A is an employee of Company A.

Control is then passed to operation 450, and Employee A's computer presents the summary of the claims from the display token to Employee A for review. In some embodiments, Employee A is given the option to review the contents of the security token using the display token, and then decide whether or not to forward the security token to the web site of Travel Agency A based on the information in the display token presented to Employee A. In other embodiments, Employee A is not given the option regarding whether or not to forward the security token to Travel Agency A.

Next, at operation 460, the security token is forwarded to the web site of Travel Agency A. Control is then passed to operation 470, and Employee A gains access to the requested discounted travel arrangements on the web site of Travel Agency A.

Figure 8:
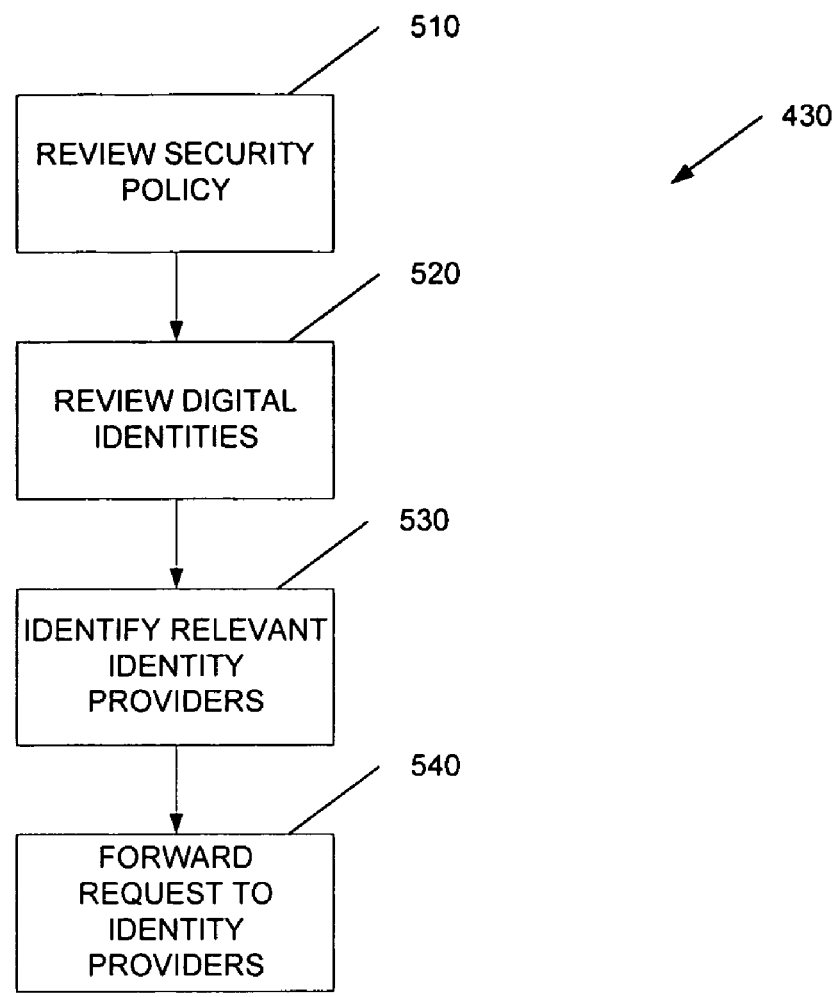
FIG. 8 illustrates an example method for forwarding a request for one or more claims to an identity provider.

Referring now to FIG. 8, operation 430 of method 400 related to forwarding of a request based on the security policy of a relying party to an identity provider is shown in greater detail. At operation 510, the security policy from relying party 120 is reviewed. At operation 520, digital identities 310 for principal 110 are reviewed to identify identity providers 115 that can provide the claims required in the security policy. Next, at operation 530, the relevant identity providers are identified based on the digital identities. Finally, at operation 540, a request is forwarded to the relevant identity providers for the requested claims.

For example, with reference to the non-limiting example provided above, once Employee A's computer receives the security policy from the web site of Travel Agency A, Employee A's computer reviews the digital identities on Employee A's computer to identify the identity providers that can provide the claims required in the security policy. Once the identity providers are identified, Employee A's computer sends requests one or more of the identified identity providers for security tokens including the required claims.

In some embodiments, relying party 120 identifies a particular identity provider for a particular claim or set of claims (see the "sp:Issuer" element in the example security policy provided above). In this case, principal 110 can forward a request to the appropriate identity provider for the required claims. In some embodiments, the process of selecting identity providers can be automated by, for example, computer 300. In other embodiments, principal 110 can be involved in the selection of identity providers.

Figure 9:
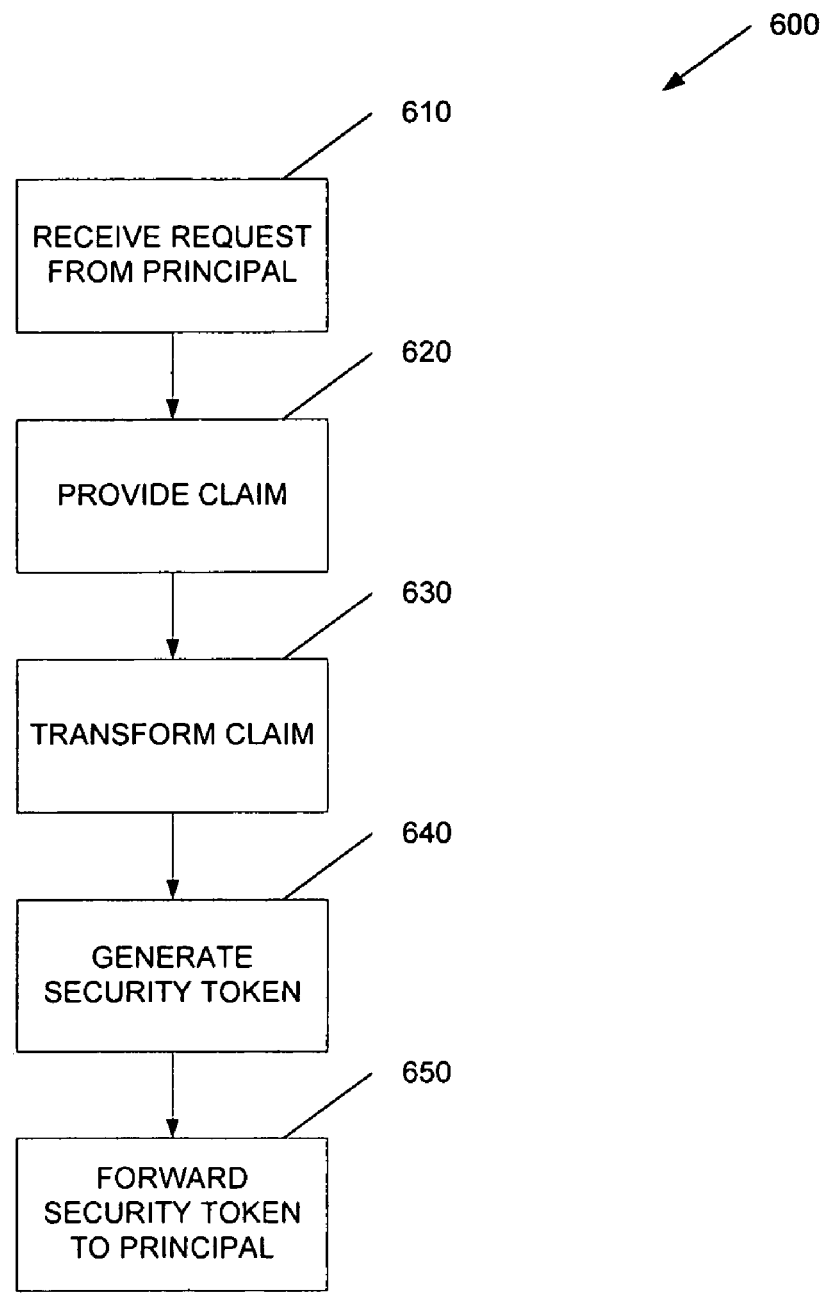
FIG. 9 illustrates an example method for generating a security token including one or more claims.

Referring now to FIG. 9, an example method 600 for an identity provider to generate a requested security token is provided. Once again, method 600 is described with reference to the non-limiting example provided above. At operation 610, the identity provider for Company A receives the request for claims forwarded by Employee A. Next, at operation 620, Company A generates the requested claims.

Control is then passed to operation 630, wherein any transformation of the claims is conducted. For example, Travel Agency A can require a claim specifying that Employee A is an employee of Company A. The claims authority of Company A provides a claim stating that Employee A is employee number "9999" of Company A (e.g., "Employee A=9999"). The claims transformer of Company A can transform this claim into a claim that simply indicates that Employee A is an employee of Company A (e.g., "Is Employee of Company A=True"), thereby minimizing the amount of personal information about Employee A contained in the security token.

Next, at operation 640, the security token including the claim is generated. As part of the formation of the security token, the claims transformer of Company A can transform the security token into one of plurality of formats, as required by the request or default. Finally, at operation 650, the security token is forwarded to Employee A.

Although in some of the embodiments disclosed herein the principal is an individual, in alternative embodiments, the principal can be a company, an organization, a computer or other device, a service, or any other type of entity. For example, in one alternative embodiment, the principal is a device that is part of a network. The device can request information, such as a software update, from another device on the network functioning as a relying party. The relying party can require authentication of the identity of the device before the relying party provides the requested update. The device can request one or more claims required by the security policy of the relying party from one or more claims transformers, and the claims transformers can provide one or more security tokens including display tokens to the device. The device can be programmed to review the contents of the display tokens and decide whether or not to forward the security token to the relying party based on its contents. If the device forwards the security token to the relying party, the relying party can then complete the authentication process and provide the requested update to the device.

Although example embodiments shown herein illustrate a security token that is forwarded by an identity provider to a principal and then on to a relying party, in alternative embodiments the security token can be forwarded directly from the identity provider to the relying party. For example, in some embodiments, one security token including a computational token (and possibly a display token) can be forwarded to the relying party, and another security token including a display token (and possibly the computational token) can be forwarded to the principal. Other configurations are possible.

Although the example embodiments shown herein illustrate a security policy requiring only a single claim and a single security token issued by one identity provider, in other embodiments a policy can require multiple claims, and one or more identity providers can issue one or more security tokens with one or more claims to satisfy the policy.

There can be various advantages associated with digital identities systems configured as disclosed herein. For example, example identity systems disclosed herein utilize various subsystems that communicate or facilitate communication using a variety of protocols and message formats. In addition, such identity systems can automate the process of gathering required authentication information. Further, such systems can increase user control and decrease personal information shared among subsystems of the system.

The various embodiments described above are provided by way of illustration only and should not be construed to limiting. Those skilled in the art will readily recognize various modifications and changes that may be made to the embodiments described above without departing from the true spirit and scope of the disclosure or the following claims.

What is claimed is:

1. A digital identity system, the digital identity system comprising
  a first computer, the first computer associated with a principal, the first computer comprising storage media that store computer readable instructions, execution of the computer readable instructions causing the first computer to:
    store a first digital identity at the first computer, the first digital identity associated with the principal and a first identity provider, the first digital identity comprising a first XML document, the first XML document containing a first claim list, the first claim list specifying claims that the first identity provider is able to provide;
    store a second digital identity at the first computer, the second digital identity associated with the principal and a second identity provider, the second digital identity comprising a second XML document, the second XML document containing a second claim list, the second claim list specifying claims that the second identity provider is able to provide;
    after storing the first digital identity and the second digital identity at the first computer, send a request to a relying party;
    receive a security policy from the relying party in response to the request, the security policy comprising a third XML document, the third XML document specifying a security token type required by the relying party and specifying required claims;
    in response to receiving the security policy, automatically determine, based on a review of the claims specified by the first claim list and the second claim list, that the first claim list specifies each of the required claims;
    after determining that the first claim list specifies each of the required claims, send a first token request to the first identity provider, the first token request requesting a first security token, the first token request indicating one or more of the required claims specified by the security policy;
    receive the first security token from the first identity provider, the first security token including a third claim list, the third claim list including the one or more required claims specified by the security policy, the first security token being of the security token type specified by the security policy; and
    forward the security token to the relying party.

2. The digital identity system of claim 1,
  wherein one or more of the claims in the security token are semantically altered relative to claims provided by the first identity provider.

3. The digital identity system of claim 2, wherein the claims included in the first security token are semantically altered so that the claims in the first security token reveal less personal information about the principal than the claims provided by the first identity provider.

4. The digital identity system of claim 2, wherein execution of the computer readable instructions further causes the first computer to:
  send a second token request to the first identity provider, the second token request requesting a second security token; and
  receive the second security token, the second security token being of a different security token type.

5. The digital identity system of claim 1, wherein the first computer receives the first security token from a second computer, the second computer associated with the identity provider.

6. The digital identity system of claim 1, wherein the first security token includes a computational token and a display token, the computational token including the claims in the third claim list in an encrypted format, the display token including at least a summary of the claims in the third claim list, the summary in a format that can be reviewed by the principal.

7. The digital identity system of claim 1,
wherein the first digital identity includes an inline image that provides a graphical image for the digital identity that can be displayed in user interfaces, a friendly name for the digital identity, and a friendly name for the issuer of the digital identity; and
wherein execution of the computer readable instructions further cause the first computer to display the graphical image, the friendly name for the digital identity, and the friendly name for the issuer of the digital identity to the principle.

8. The digital identity system of claim 1, wherein prior to storing the first digital identity and the second digital identity, execution of the computer readable instructions further causes the first computer to:
send a first digital identity request to the first identity provider;
receive the first digital identity from the first identity provider in response to the first digital identity request;
send a second digital identity request to the second identity provider; and
receive the second digital identity from the second identity provider in response to the second digital identity request.

9. A method for providing a digital identity, the method comprising:
sending, by a first computer, a digital identity to a second computer, the first computer associated with an identity provider, the second computer associated with a principal, the digital identity comprising a first XML document that contains a listing of claims that an identity provider is able to provide, the digital identity being an artifact that represents a token issuance relationship between the principal and the identity provider;
after sending the digital identity to the second computer, receiving, by the first computer, a token request from the second computer, the token request requesting a security token, the token request comprising a second XML document, the second XML document specifying one or more of the claims indicated by the digital identity, the second XML document specifying a security token type;
in response to receiving the token request, generating, by the first computer, claims specified by the second XML document;
after generating the claims, transforming, by the first computer, the claims;
after transforming the claims, generating, by the first computer, the security token, the security token including the claims specified by the second XML document, the security token being of the security token type specified by the second XML document; and
sending, by the first computer, the security token to the second computer in response to the request.

10. The method of claim 9, wherein transforming the claims comprises altering, by the first computer, the claims included in the security token semantically.

11. The method of claim 10, wherein altering the claims further comprises altering, by the first computer, the claims so that the claims reveal less personal information about the principal.

12. The method of claim 9, wherein transforming the claims comprises formatting, by the first computer, the claims from one format into another format.

13. The method of claim 9, further comprising:
sending, by the second computer, a request to a relying party for a security policy;
receiving, by the second computer, the security policy from a third computer, the third computer associated with the relying party, the security policy comprising a third XML document, the third XML document specifying the security token type as being required by the relying party and specifying the one or more claims related to the identity of the principal;
sending, by the second computer, the request for the claims to the first computer; and
after receiving the security token from the first computer, forwarding, by the second computer, the security token to the third computer.

14. The method of claim 13, further comprising:
receiving, by the second computer, a selection by the principal of a given digital identity of the principal from among a plurality of digital identities of the principal stored at the second computer, each digital identity in the plurality of digital identities comprising an XML document that represents a token issuance relationship between the principal and a particular identity provider; and
selecting, by the second computer, the identity provider based on the given digital identity.

15. The method of claim 9, wherein generating the security token further includes generating, by the first computer, the security token to include a computational token and a display token, the computational token including the claims in an encrypted format, the display token including at least a summary of the claims in a format that can be reviewed by the principal.

16. A non-transitory computer-readable storage medium comprising computer-executable instructions that, when executed by a first computer, cause the first computer to:
send a digital identity to a principal, the digital identity comprising a first XML document, the first XML document containing:
a listing of claims that an identity provider is able to provide,
a globally unique identifier for the digital identity,
a date and time when the digital identity was issued,
a hint to be displayed to the principle to help provide a right credential,
an unambiguous description of credential to use for authenticating to the identity provider,
an inline image that provides a graphical image for the digital identity that can be displayed in user interfaces,
a date and time after which the digital identity is expired,
a friendly name for the digital identity, and
a friendly name for the issuer of the digital identity, and
a list of token types that the identity provider can issue;
wherein the digital identity being an artifact that represents a token issuance relationship between the principal and the identity provider;
after sending the digital identity to the principal, receive a token request from a second computer, the second computer associated with the principal, the token request requesting a security token, the token request comprising a second XML document, the second XML document specifying one or more requested claims, the requested claims related to an identity of the principal, the requested claims being among the claims in the listing of claims contained by the digital identity, the second XML document specifying a security token type;

generate the requested claims in a first format;

transform the requested claims such that the requested claims are formatted in a second format and such that the requested claims are altered semantically such that the requested claims reveal less personal information about the principal, the second format being a format required by the relying party, the second format being different from the first format;

after transforming the requested claims into the second format, encrypt the requested claims;

after encrypting the requested claims, generate the security token, the security token including a computational token and a display token, the computational token being of the security token type specified by the second XML document, the computational token including the requested claims, the display token including each of the requested claims in a format that can be reviewed by the principal, the display token cryptographically bound to the computational token; and send the security token to the second computer.

* * * * *